(12) United States Patent
Booker

(10) Patent No.: US 10,634,870 B2
(45) Date of Patent: Apr. 28, 2020

(54) ACTUATOR DEVICES FOR CONVERTING ROTATIONAL INPUT TO LINEAR OUTPUT

(71) Applicant: Goodrich Corporation, Charlotte, NC (US)

(72) Inventor: Jesse W. Booker, Fairfield, CT (US)

(73) Assignee: Goodrich Corporation, Charlotte, NC (US)

( * ) Notice: Subject to any disclaimer, the term of this patent is extended or adjusted under 35 U.S.C. 154(b) by 937 days.

(21) Appl. No.: 15/048,465

(22) Filed: Feb. 19, 2016

(65) Prior Publication Data

US 2017/0242218 A1  Aug. 24, 2017

(51) Int. Cl.
| | |
|---|---|
| *G02B 7/182* | (2006.01) |
| *F16H 21/54* | (2006.01) |
| *F16H 35/18* | (2006.01) |
| *F16H 49/00* | (2006.01) |

(52) U.S. Cl.
CPC ........... *G02B 7/1827* (2013.01); *F16H 21/54* (2013.01); *F16H 35/18* (2013.01); *F16H 49/001* (2013.01)

(58) Field of Classification Search
CPC ...... G02B 7/003–005; G02B 7/18–185; G02B 17/00–00896; G02B 7/1827; G02B 7/182; G02B 7/1822; F16C 1/00–28; F16H 27/00–28; F16H 21/54; F16H 35/18; F16H 49/001
USPC ......................................................... 359/399
See application file for complete search history.

(56) References Cited

U.S. PATENT DOCUMENTS

| | | | |
|---|---|---|---|
| 5,969,592 A | 10/1999 | Reed | |
| 6,478,434 B1 | 11/2002 | Streetman et al. | |
| 9,787,157 B2 * | 10/2017 | Booker | G02B 7/183 |
| 10,468,214 B2 * | 11/2019 | Ebelsberger | H01H 3/30 |
| 2014/0260715 A1 * | 9/2014 | Smith | F16H 19/065 74/25 |
| 2014/0327914 A1 * | 11/2014 | Jackson | G01J 3/0202 356/451 |
| 2015/0123417 A1 | 5/2015 | Patoglu | |
| 2015/0341534 A1 | 11/2015 | Ng et al. | |
| 2016/0036293 A1 * | 2/2016 | Booker | G02B 7/183 310/80 |
| 2019/0096612 A1 * | 3/2019 | Ebelsberger | H01H 33/666 |

FOREIGN PATENT DOCUMENTS

WO   WO 2015200731 A2   12/2015

\* cited by examiner

*Primary Examiner* — William R Alexander
(74) *Attorney, Agent, or Firm* — Locke Lord LLP; Scott D. Wofsy; Joshua L. Jones

(57) ABSTRACT

An actuator device includes a cartwheel flexure having a central moving carriage component configured for parallel motion along an axis of the actuator device. A frame is configured to remain stationary relative to the central moving carriage component. A plurality of cross-beams flexibly support the central moving carriage from the frame, wherein the plurality of cross-beams provide flexibility for movement of the central moving carriage relative to the frame along the axis and provide rigidity in other directions.

15 Claims, 6 Drawing Sheets

ACTUATOR DEVICES FOR CONVERTING ROTATIONAL INPUT TO LINEAR OUTPUT

FIELD

Embodiments of the invention relate to actuators, and more particularly to actuators for use in converting rotational input to linear output.

BACKGROUND

In certain applications, such as optical telescopes/systems, it may be desirable to achieve precise positioning and control of various components. For example, in optical telescopes, it may be important to precisely position mirrors or optical elements over optically large distances in small increments (e.g., on the order of nanometers). The need for precision, among other considerations, drives the design of actuators used in controlling and moving the optical elements. Typically, these requirements are met using a motor and screw design, with the screw being, for example, ball, roller, or lead screws. Such designs include a large number of parts, thereby adding weight and complexity to the overall system.

Such conventional methods and systems have generally been considered satisfactory for their intended purpose. However, there is still a need in the art for improved actuator systems. There is also a need for such systems that are easy to make and use. The present disclosure provides a solution for these problems.

SUMMARY

An actuator device includes a cartwheel flexure having a central moving carriage component configured for parallel motion along an axis of the actuator device. A frame is configured to remain stationary relative to the central moving carriage component. A plurality of cross-beams flexibly support the central moving carriage from the frame, wherein the plurality of cross-beams provide flexibility for movement of the central moving carriage relative to the frame along the axis and provide rigidity in other directions.

The cartwheel flexure of the actuator device can include three circumferentially spaced arms, each arm having a plurality of cross-beams operatively connecting the central moving carriage component to the frame. Each arm can further include one or more flexure paths, each flexure path having a first cross-beam connecting the frame to a side beam, and a second cross-beam connecting the side beam to the central moving carriage component.

A cartwheel flexure joint can connect the frame to the first cross-beam and another cartwheel flexure joint may connect the first cross beam to the side beam. A cartwheel flexure joint can connect the side beam to the second cross-beam and another cartwheel flexure joint may connect the second cross-beam to the central moving carriage component.

The actuator device can also include a motor section and a flexure section. The flexure section can include a rotary flexure operatively coupled to the motor section and configured to receive rotational input from the motor section, a helical flexure operatively coupled to the rotary flexure, the helical flexure comprising a plurality of cross-blade flexures oriented at an angle to the rotary flexure, and the cartwheel flexure operatively coupled to the helical flexure via the cross-blade flexures. The flexure section can be configured to convert rotational input from the motor section into linear displacement output.

The rotary flexure can have an axial stiffness greater than that of the cartwheel flexure and that of the cross-blade flexures. The cartwheel flexure can have a rotational stiffness greater than that of the cross-blade flexures.

The actuator device can further include a top plate operatively coupled to the cartwheel flexure, the top plate being configured to move in a linear motion defined by the cartwheel flexure. A connector shaft can be used to couple the top plate to the central moving carriage component of the cartwheel flexure via a bore through the frame in the cartwheel flexure. The bore can extend from a top surface of the frame of the cartwheel flexure through at least a portion of the central moving carriage component of the cartwheel flexure. The top plate can further be configured to be operatively coupled to the cross-blade flexures.

The motor section of the actuator device may include a stepper motor, a first harmonic drive and/or a second harmonic drive.

The actuator device may be mounted in an optical telescope and the cartwheel flexure may be operatively coupled to a mirror of the optical telescope to control linear movement of the mirror.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION

Figure 1:
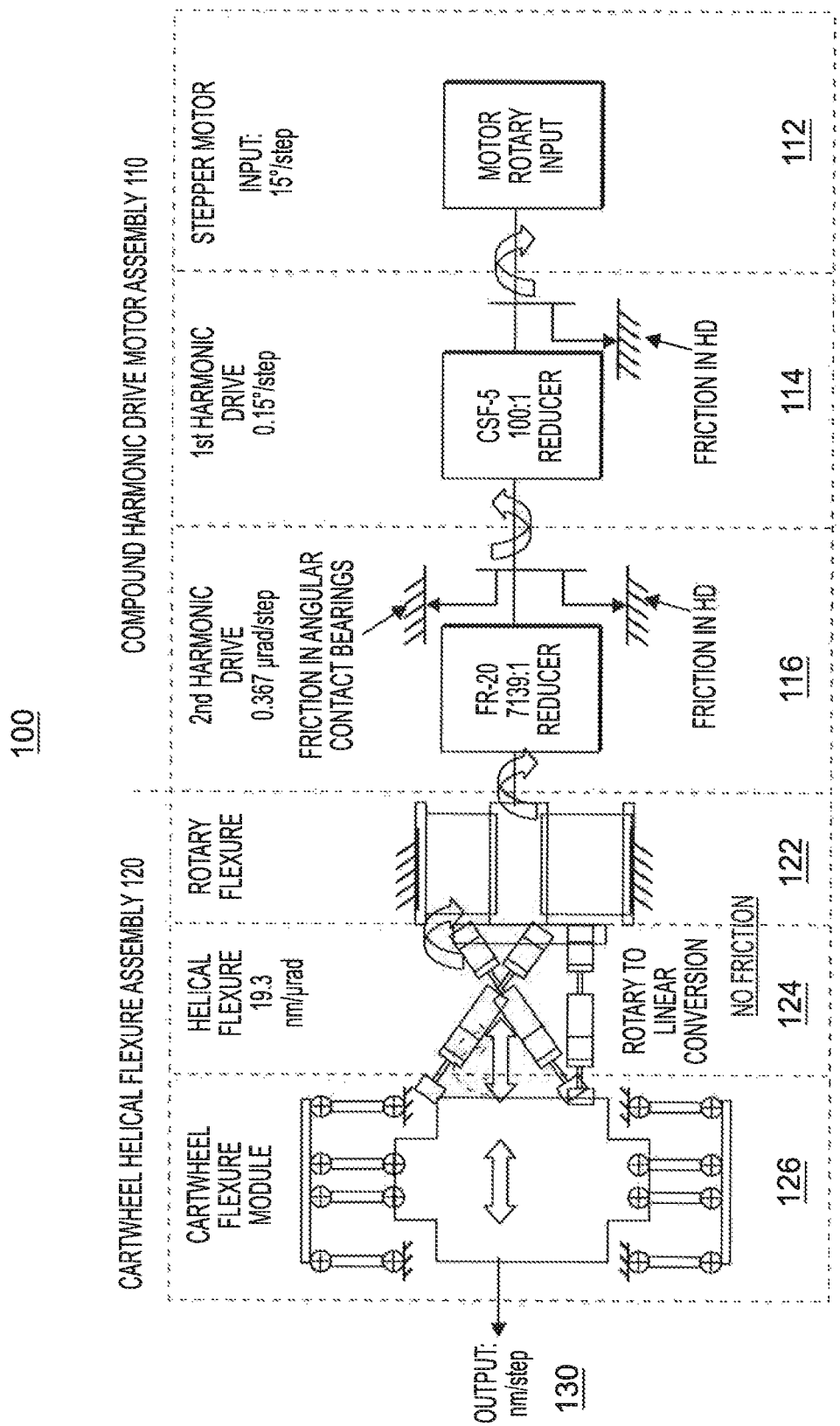
FIG. 1 is a schematic diagram of an actuator, according to an exemplary embodiment in accordance with this disclosure.

Reference will now be made to the drawings wherein like reference numerals identify similar structural features or aspects of the subject disclosure. For purposes of explanation and illustration, and not limitation, a partial view of an exemplary embodiment of the actuator in accordance with the disclosure is shown in FIG. 1 and is designated generally by reference character 100. Other embodiments of the actuator in accordance with the disclosure, or aspects thereof, are provided in FIGS. 2-6, as will be described.

In various systems, such as optical telescopes, there is often a need to precisely position mirrors or optical elements over optically large distances in small increments. For example, in large deployable telescopes a primary mirror segment is typically moved a total of 1 to 10 millimeters (mm) in increments of 5 to 10 nanometers (nm). These large dynamic range requirements (i.e., >100,000:1) drive the design of any actuator that is employed to move the optic, especially when they are combined with the other requirements of the actuator (e.g., lightweight, temporally and thermally stable, high strength, and compact). These requirements are conventionally met using gears, ball screws, which are subject to wear as they can cause friction and require the use of lubricants. Consequently, these conventional devices are imprecise and unreliable.

Various embodiments herein provide actuators that use flexures instead of rolling or sliding surfaces, thereby reducing or eliminating issues associated with friction as well as backlash and hysteresis. Embodiments herein do not require the use of lubricants in the flexure section. Furthermore, there is minimal to no wear of the actuator's components, which increases the actuator's lifespan.

Referring to the figures, FIG. 1 shows a schematic diagram of an exemplary embodiment of an actuator 100. Actuator 100 includes a compound harmonic drive motor assembly/mechanism 110 (i.e., a motor section 110) and a cartwheel helical flexure assembly/mechanism 120 (i.e., a flexure section 120). The motor section 110 includes a stepper motor 112, a first harmonic drive 114 and a second harmonic drive 116. As used herein, a flexure may refer to a mechanical component that is designed to be as stiff as possible (or as stiff as needed/desired) in certain directions, while being as flexible as possible (or as flexible as necessary/desired) in other directions. The motor section 110 employs a stepper motor 112 and gear reduction techniques to produce, at its output, small rotational steps. For example, first harmonic drive 114 may provide a precise gear reduction ratio ranging from 30:1 to 160:1 while the second harmonic drive 114 may provide a gear reduction ratio ranging from 72:1 to 14,399:1. The output of the motor section 110 is directly coupled to the input of the flexure section 120. Subsequently, the flexure section 120 may convert the rotational motion to linear motion. The output 130 of the flexure section 120 may be a linear displacement to adjust an optical component, such as a mirror, operatively connected to the flexure section 120. As such, embodiments of the invention may be configured to convert rotary motion into linear displacement for precise movement of a mirror (or other object), for example, over a 5 mm range with a step size of approximately 7 nm. Any other suitable range and step size can be used without departing from the scope of this disclosure. Details of components of the actuator 100 are further delineated below with reference to FIGS. 2-9.

Figure 2B:
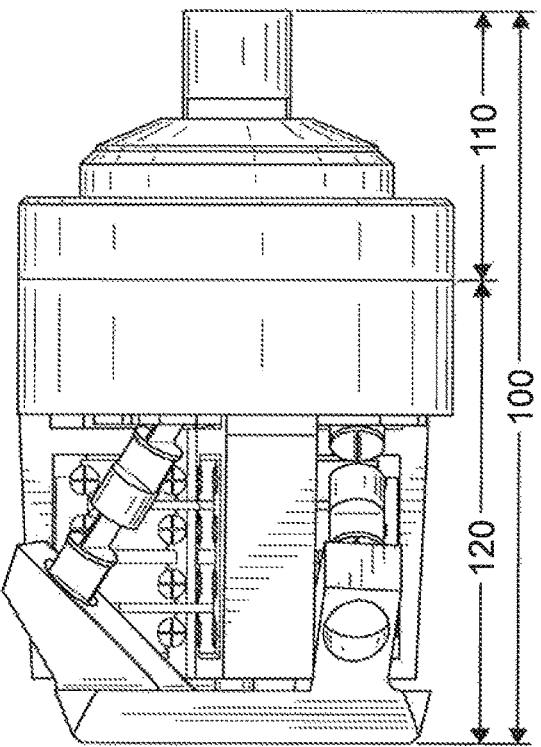
FIG. 2B shows a side view of the actuator of FIG. 1.
Figure 2C:
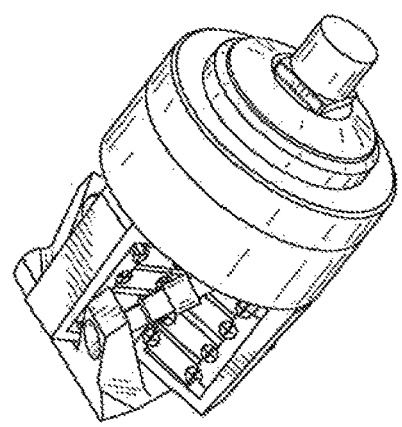
FIG. 2C shows an isometric view of the actuator of FIG. 1.
Figure 2A:
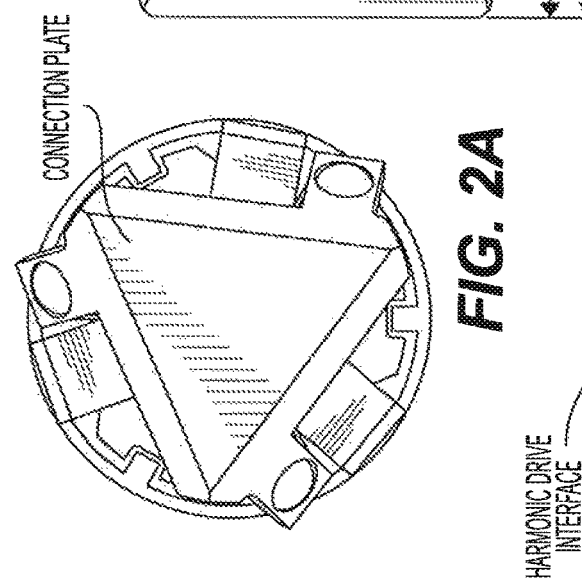
FIG. 2A shows a top view of the actuator of FIG. 1.
Figure 2D:
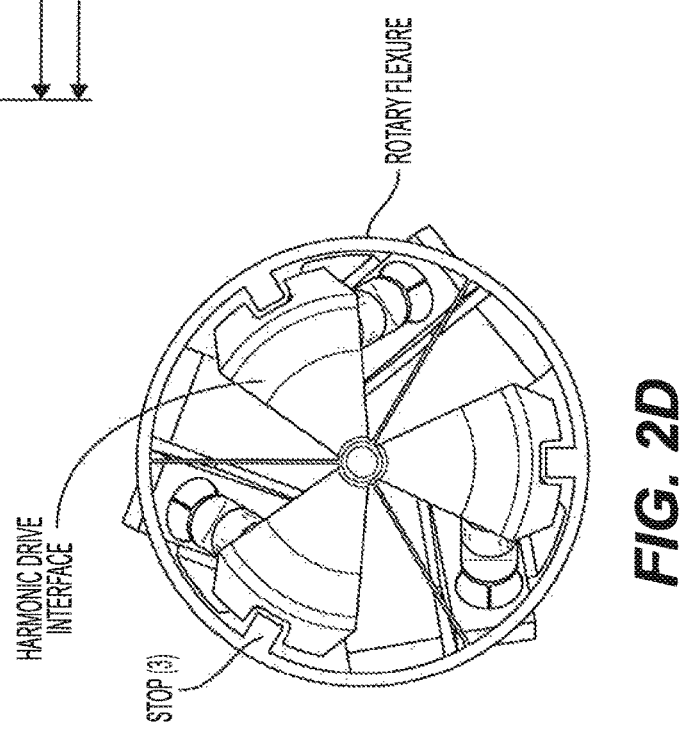
FIG. 2D shows a bottom view of the rotary flexure of the actuator of FIG. 1.

FIG. 2A shows a top view of an assembled actuator 100 of FIG. 1. FIG. 2B shows a side view of an assemble actuator 100 of FIG. 1. FIG. 2C shows an isometricview of the assembled actuator 100. FIG. 2D shows a bottom view of the rotary flexure of the assembled actuator 100.

Figure 3:
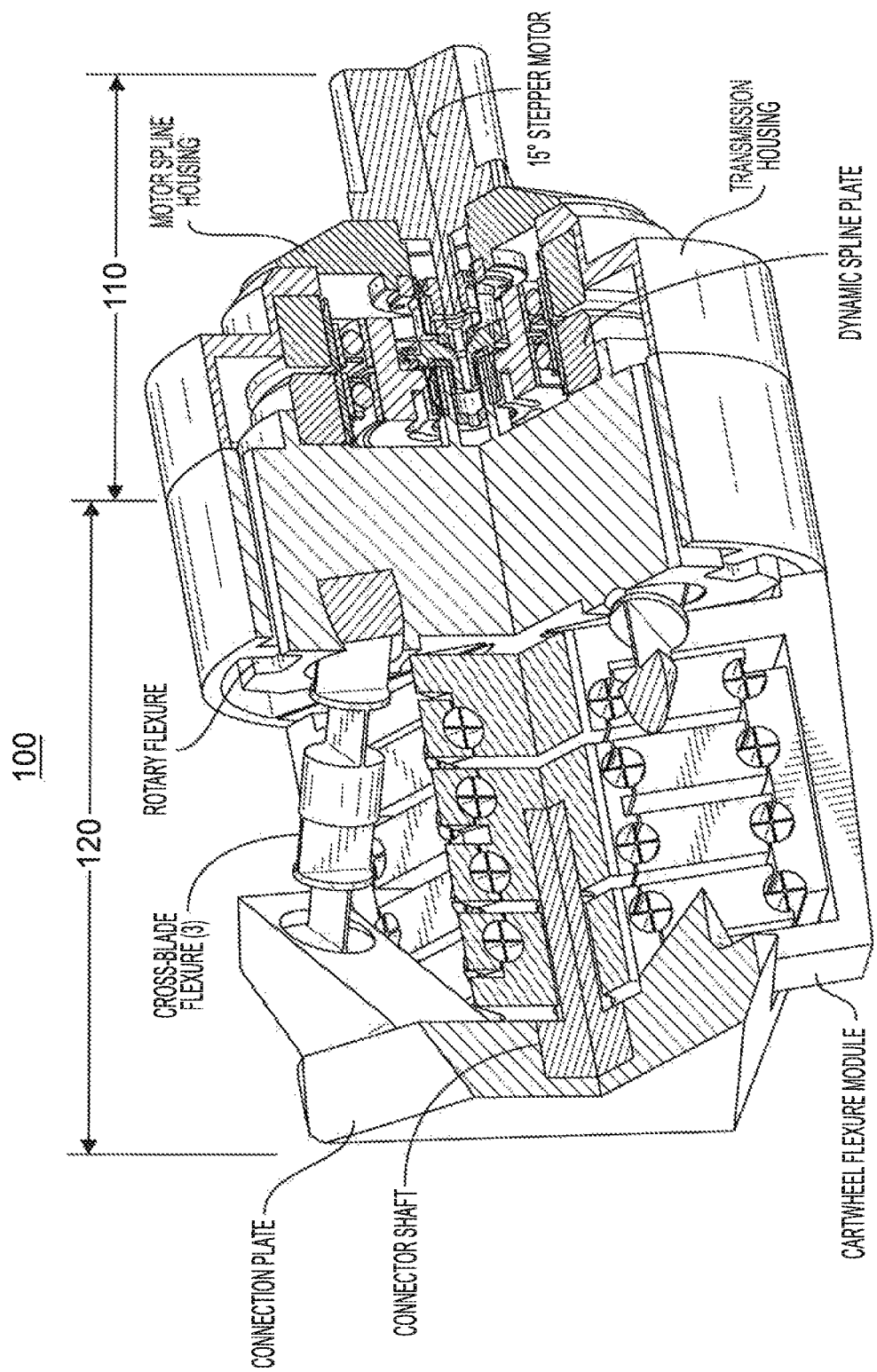
FIG. 3 shows a isometric partial cross-sectional view of the actuator of FIG. 1.

FIG. 3 shows a partial sectional view of the actuator of FIG. 1. As shown, actuator 100 includes a motor section 110 having motor spline housing, stepper motor, transmission housing, dynamic spline, etc. Actuator 100 also includes a flexure section 120 having a rotary flexure, multiple cross-blade flexures, a cartwheel flexure module, a connection shaft, a connection plate, etc.

Figure 4:
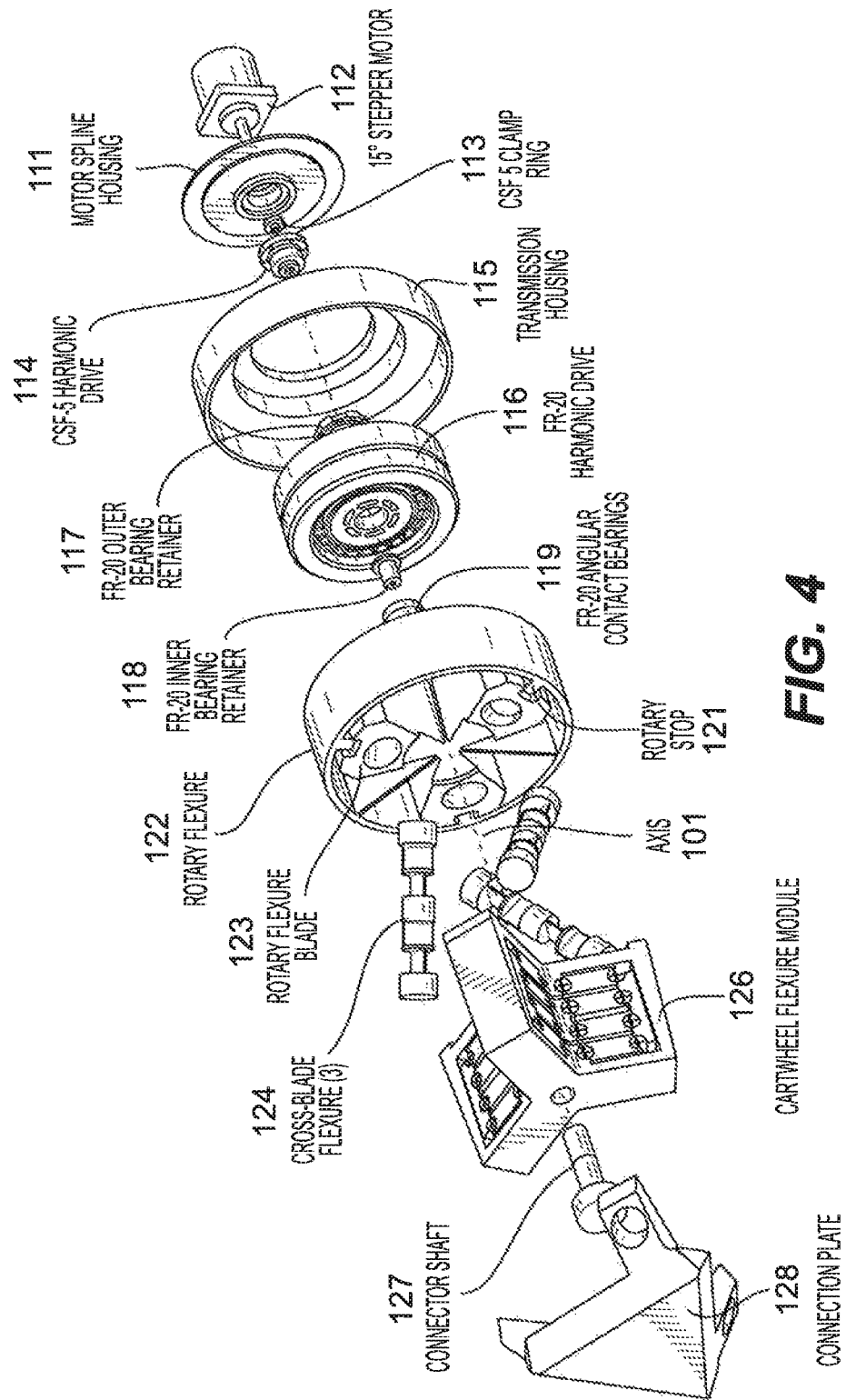
FIG. 4 shows an exploded perspective view of a motor section and a flexure section of the actuator of FIG. 1.

FIG. 4 shows a perspective exploded view of the actuator of FIG. 1. The actuator may include a motor spline housing 111, a stepper motor 112, a clamp ring 113, first harmonic drive 114, transmission housing 115, second harmonic drive 116, outer bearing retainer 117, inner bearing retainer 118, angular contact bearings 119, rotary flexure 122 having rotary flexure blades 123 and rotary stops 121, cross-blade flexures 124, cartwheel flexure module 126, connector shaft 127 and connection plate 128.

Linear motion is generated due to the intrinsic nature of a helical flexure, such as helical flexure 124 of FIG. 1. In various embodiments, a helical flexure may be composed of cross-blade flexure blades, such as cross-blade flexures 124, oriented at an angle to a top plate and a bottom plate. When one of the plates is held fixed and the other plate is rotated, the moving plate will depict a helical path that is defined by the inclined angle of the blade fixtures. The helical flexure is prevented from rotating due to a rigid connection to the cartwheel flexure module and thus provides only linear translation, and the cross-blade flexures bend to compensate. In certain embodiments of the invention, the bottom plate of the helical flexure is a monolithic rotary flexure (e.g., rotary flexure 122) that is flexible in rotation but stiff in its axial direction. In addition, the top plate (e.g., connection plate 128) of the actuator's helical flexure is fastened to a central moving carriage of a cartwheel flexure module (e.g., cartwheel flexure module 126). The cartwheel flexure module 126 allows only parallel motion along the axis (e.g., axis 101) of the module. Therefore, when rotary motion is applied to the actuator's rotary flexure, the top plate travels in a linear motion as defined by the motion of the cartwheel flexure module because the rotary flexure's axial stiffness is greater than the axial stiffness of the cartwheel flexure module and greater than the axial stiffness of the cross-blade flexures. It should also be noted that the top plate is unable to rotate due to the larger rotational stiffness of the cartwheel flexure module as compared to the cross-blade flexures.

Figure 5A:
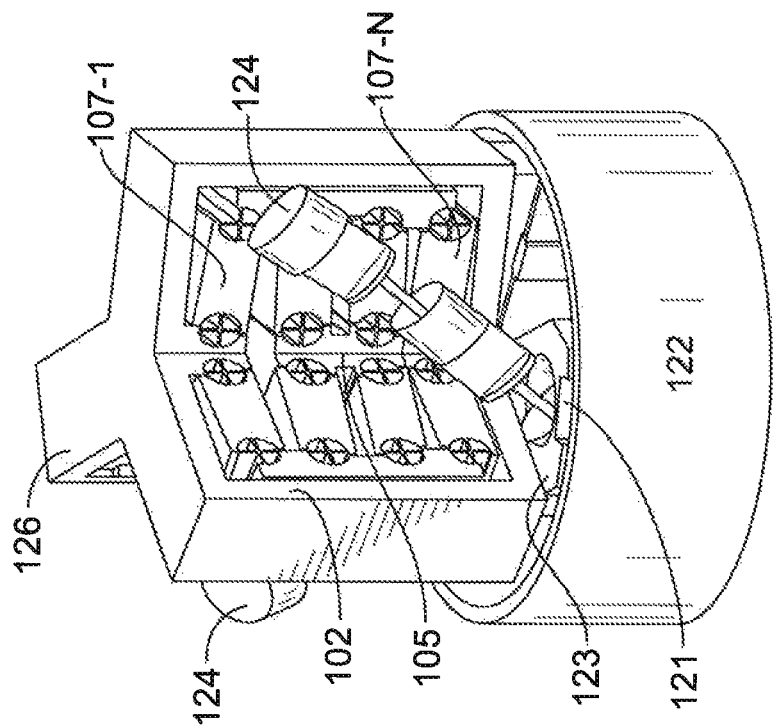
FIG. 5A is a perspective view of a portion of the actuator of FIG. 1, showing a flexure section of the actuator, with a central moving carriage in the up position.
Figure 5B:
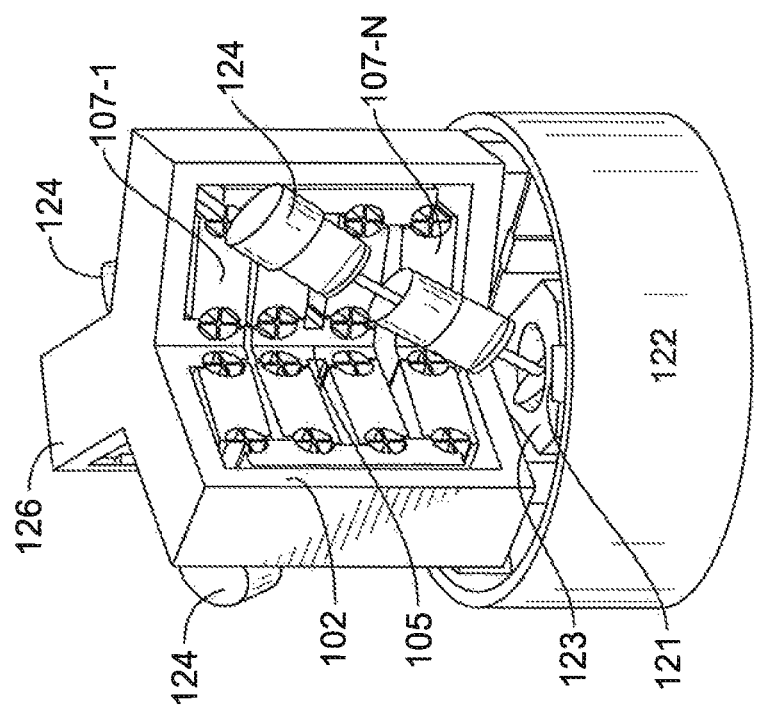
FIG. 5B shows the flexure section of the actuator of FIG. 5A, with the central moving carriage in the down position.

FIGS. 5A and 5B show the flexure section 110 of FIG. 1 with a central moving carriage component in the up position and down position, respectively. As shown, FIGS. 5A and 5B include rotary flexure 122, cross-blade flexures 124 and cartwheel flexure module 126.

FIG. 5A shows a central moving carriage component 105 and cross-beams 107-1 . . . 107-N in an up-position relative to a frame 102 of the cartwheel flexure module 126. FIG. 5B shows a central moving carriage component 105 and cross-beams 107-1 . . . 107-N in a down-position relative to a frame 102 of the cartwheel flexure module 126. The motor section's small rotational input is received by the rotary flexure 122 and transformed by the flexure section into linear displacement. Specifically, the rotary flexure blades 123 rotate in response to the rotational input received from the motor section, each rotary flexure blade 123 is configured to be operatively coupled to a cross-blade flexure 124, which is in turn operatively coupled to the cartwheel flexure module 126. The movement of the rotary flexure blades 123 is limited by the rotary stops 121[the stops are easier to see in FIG. 2D—that's why this figure exists], and the rotational movement of the rotary flexure blades 123 is translated into small linear displacement (e.g., small steps) by the cross-blade flexures 124 in conjunction with the cartwheel flexure module 126. The cross-blade flexures 124 provide piston motion by directly transforming rotary motion into linear output using flexures only. It should be noted that the angle of the cross-blade flexures 124 determines the range and resolution (e.g., step size) of the mechanism. Specifically, as the angle of the cross-blade flexures 124 increases (i.e., moves closer to being horizontal), the mechanism's range increases and the resolution decreases (e.g., step size gets larger). Therefore, the mechanism can be designed for various range and resolution by tilting the cross-blade flexures 124.

Figure 6A:
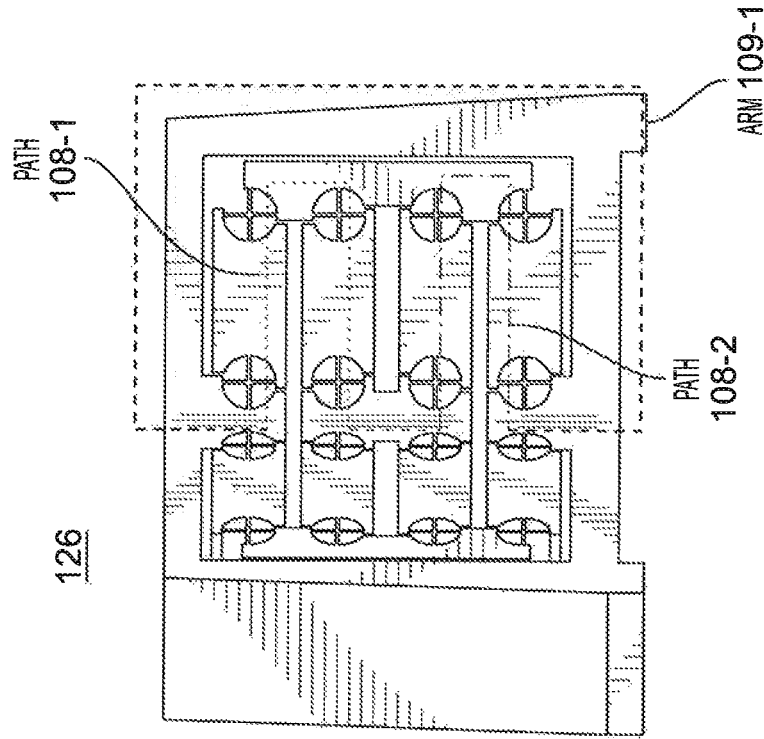
FIGS. 6A and 6B are, respectively, perspective and elevation views of a portion of the actuator of FIG. 1, showing a cartwheel flexure module of the actuator.
Figure 6B:
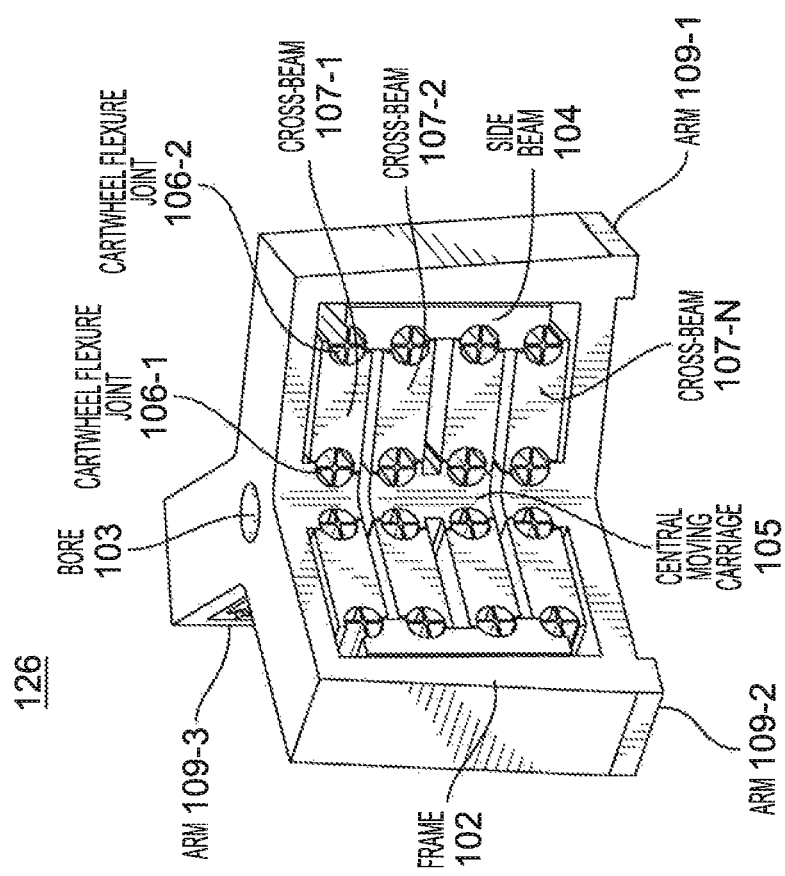

FIGS. 6A and 6B show an exemplary cartwheel flexure 126 as used in actuator 100 described in FIG. 1 above. The cartwheel flexure 126 includes a central moving carriage component 105 configured for parallel motion along an axis (e.g., axis 101 shown in FIG. 4) of the actuator device, a frame 102 configured to remain stationary relative to the central moving carriage component 105, and a plurality of cross-beams 107-1 . . . 107-N flexibly supporting the central moving carriage 105 from the frame 102, such that the cross-beams 107-1 . . . 107-N provide flexibility for movement of the central moving carriage 105 relative to the frame 102 along the axis while providing rigidity in all other directions. The cartwheel flexure 126 may be configured to include three circumferentially spaced arms 109-1, 109-2 and 109-3, each arm including a plurality of cross-beams operatively connecting the central moving carriage 105 component to the frame 102. In certain embodiments, each of the arms 109-1 . . . 109-3 may include a mirrored pair of cross-beams forming two flexure paths for a total of four cross-beams per arm. Each of the flexure paths (e.g., paths 108-1 and 108-2 as shown in FIG. 6B) may have a first cross-beam (e.g., 107-1) connecting the frame 102 to a side beam 104, and a second cross-beam (e.g., 107-2) connecting the side beam 104 to the central moving carriage component 105. Furthermore, each of the arms 109-1 . . . 109-3 may include a plurality of cartwheel flexure joints 106-1 . . . 106-N, with each cross-beam 107 having a pair of cartwheel flexure joints. In each path, a first cross-beam (e.g., cross-beam 107-1) may have cartwheel flexure joints (e.g., cartwheel flexure joints 106-1 and 106-2) and a second cross-beam (e.g., cross-beam 107-2) having a pair of cartwheel flexure joints (e.g., cartwheel flexure joints 106-3 and 106-4). The first cartwheel flexure joint 106-1 connects the frame 102 to the first cross-beam 107-1 and the other cartwheel flexure joint 106-2 connects the first cross-beam 107-1 to the side beam 104. Similarly, for the second cross-beam 107-2, a first cartwheel flexure joint 106-3 connects the side beam 104 to the second cross-beam 107-2 and another cartwheel flexure joint 106-4 connects the second cross-beam 107-2 to the central moving carriage component 105.

A cartwheel flexure module 126 as shown in FIGS. 6A and 6B may be manufactured using any suitable material, such as titanium, and created using an electrical discharge machining (EDM) process to form the cross-beam, cartwheel flexure joints, central moving carriage, side beam and frame from a solid piece of stock material. Advantageously, a major challenge of having a large displacement flexure (e.g., with displacement range>1 mm) while still retaining significant stiffness in all directions can be overcome by the use of a cascaded cartwheel flexure as shown in FIGS. 6A and 6B. The cartwheel flexures described herein are inherently stiff axially and laterally, thereby allowing for completely linear translation at output. Moreover, the stiffness of the cartwheel flexures may be tuned via varying several dimensions, such as the thickness, beam length, cartwheel diameter, beam width, etc. Cartwheel flexures described herein can also be scaled to provide greater than 5 mm range.

One or more actuators as described herein may be used to move and/or adjust one or more optical components in an optical system, such as a telescope system. For example, the connection plate as described above may be configured for attachment to a mirror of the telescope. The linear output of the cartwheel flexure module may be used to move the mirror in a positive or negative direction depending on the rotational input received from the motor section of the actuator.

Various embodiments herein provide a method for converting rotational input into linear output using one or more actuators. The method includes producing rotational output at a motor section of an actuator device, receiving at a flexure section, as rotational input, the rotational output from the motor section, and converting the rotational input into a linear displacement output at the flexure section. The flexure section includes a rotary flexure, a helical flexure with a plurality of cross-blade flexures, and a cartwheel flexure having a central moving carriage component. Converting the rotation input into the linear displacement output comprises rotating the rotary flexure and thereby defining a helical path determined by an inclined angle of the cross-blade flexures, converting rotational movement of the cross-blade flexures into linear movement of the central moving carriage component of the cartwheel flexure, and linearly displacing a top plate operatively coupled to the cartwheel flexure based on the linear movement of the cartwheel flexure.

Therefore, embodiments of the invention are superior to actuators designed with the use of gears and ball screw devices. By using flexures instead of rolling or sliding surfaces, embodiments of the invention reduce or eliminate friction as well as backlash and hysteresis. There is also minimal to no wear of the invention's components, thereby increasing the actuator's lifespan relative to traditional actuators. While actuators designed with ball screw mechanisms require the use of lubricants, there are no lubricants in the flexure section of actuators disclosed herein. The monolithic rotary flexure used in embodiments of the invention also reduces the number of parts and reduces and/or eliminates play in the mechanism relative to traditional actuators.

The methods and systems of the present disclosure, as described above and shown in the drawings, provide for actuators with a flexure mechanism that allows for converting rotational input to linear output for precise movement of components over an extended range. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An actuator device, comprising:
   a cartwheel flexure including a central moving carriage component configured for parallel motion along an axis of the actuator device;
   a frame configured to remain stationary relative to the central moving carriage component;
   a plurality of cross-beams flexibly supporting the central moving carriage from the frame, wherein the plurality of cross-beams provide flexibility for movement of the central moving carriage relative to the frame along the axis and provide rigidity in other directions; and
   a flexure section including:
     a helical flexure comprising a plurality of cross-blade flexures oriented at an angle to the axis;
     wherein the cartwheel flexure is operatively coupled to the helical flexure via the cross-blade flexures to convert rotational input to the helical flexure into linear displacement output from the cartwheel flexure.

2. The actuator device of claim 1, wherein the cartwheel flexure includes three arms configured to be circumferentially spaced, each arm having a plurality of cross-beams operatively connecting the central moving carriage component to the frame.

3. The actuator device of claim 2, wherein each arm further includes one or more flexure paths, each flexure path having a first cross-beam connecting the frame to a side beam, and a second cross-beam connecting the side beam to the central moving carriage component.

4. The actuator device of claim 3, wherein a cartwheel flexure joint connects the frame to the first cross-beam and another cartwheel flexure joint connects the first cross beam to the side beam; and wherein a cartwheel flexure joint connects the side beam to the second cross-beam and another cartwheel flexure joint connects the second cross-beam to the central moving carriage component.

5. The actuator device of claim 1, further comprising:
a motor section; and
wherein the flexure section, includes:
    a rotary flexure operatively coupled to the motor section and configured to receive rotational input from the motor section,
    wherein the helical flexure is operatively coupled to the rotary flexure, wherein the cross-blade flexures are oriented at an angle to the rotary flexure.

6. The actuator device of claim 5, wherein the rotary flexure has an axial stiffness greater than that of the cartwheel flexure.

7. The actuator device of claim 5, wherein the rotary flexure has an axial stiffness greater than that of the cross-blade flexures.

8. The actuator device of claim 5, wherein the cartwheel flexure has a rotational stiffness greater than that of the cross-blade flexures.

9. The actuator device of claim 5, further comprising a top plate operatively coupled to the cartwheel flexure, the top plate being configured to move in a linear motion defined by the cartwheel flexure.

10. The actuator device of claim 9, further comprising a connector shaft coupling the top plate to the central moving carriage component of the cartwheel flexure via a bore through the frame in the cartwheel flexure.

11. The actuator device of claim 10, wherein the bore extends from a top surface of the frame of the cartwheel flexure through at least a portion of the central moving carriage component of the cartwheel flexure.

12. The actuator device of claim 10, wherein the top plate is further configured to be operatively coupled to the cross-blade flexures.

13. The actuator device of claim 5, wherein the motor section includes a stepper motor.

14. The actuator device of claim 11, wherein the motor section further includes a first harmonic drive and a second harmonic drive.

15. The actuator device of claim 1, wherein the actuator device is mounted in an optical telescope and the cartwheel flexure is operatively coupled to a mirror of the optical telescope to control linear movement of the mirror.

* * * * *